US006286577B1

(12) United States Patent
Douglas et al.

(10) Patent No.: US 6,286,577 B1
(45) Date of Patent: Sep. 11, 2001

(54) PROCESS FOR FABRICATING COUNTERTOPS

(75) Inventors: Howard Lynn Douglas; Steven J. Moore, both of Temple, TX (US)

(73) Assignee: Premark RWP Holdings, Inc., Wilmington, DE (US)

( * ) Notice: Subject to any disclaimer, the term of this patent is extended or adjusted under 35 U.S.C. 154(b) by 0 days.

(21) Appl. No.: 09/365,018

(22) Filed: Aug. 2, 1999

(51) Int. Cl.[7] .................................................... B32B 31/00

(52) U.S. Cl. .......................... 156/512; 156/258; 156/264; 156/299; 156/350; 156/558; 156/517; 312/140.2; 52/782.22; 52/800.1; 52/801.1; 52/716.1; 108/27; 4/631; 4/658; 428/119

(58) Field of Search .................................... 156/512, 558, 156/265, 299, 256, 264, 258, 350, 517; 312/140.3; 52/782.22, 800.1, 801.1, 716.1; 108/27; D23/308; 4/631, 658; 428/119

(56) References Cited

U.S. PATENT DOCUMENTS 2,542,860 * 2/1951 Clements .......................... 62/796.12
3,606,508 * 9/1971 Burnes .............................. 312/140.3
4,814,220 * 3/1989 Brathwaite .......................... 428/119
5,330,262 * 7/1994 Peters ............................... 312/140.4
5,427,159 6/1995 Burgess et al. ...................... 144/3.1
5,922,157 * 7/1999 Snider ................................. 156/71

FOREIGN PATENT DOCUMENTS 2023025 2/1971 (DE) .
29600177 8/1996 (DE) .

* cited by examiner

*Primary Examiner*—Linda Gray
(74) *Attorney, Agent, or Firm*—Welsh & Flaxman LLC

(57) ABSTRACT

An integrated system and method for fabricating a countertop from a slab is disclosed. The system includes a cutting station where an apron strip of a predetermined size is cut from a slab, a translating station where the apron strip is translated and positioned along the cut edge of the slab, and a press for adhesively bonding the apron to the cut edge of the slab.

27 Claims, 3 Drawing Sheets

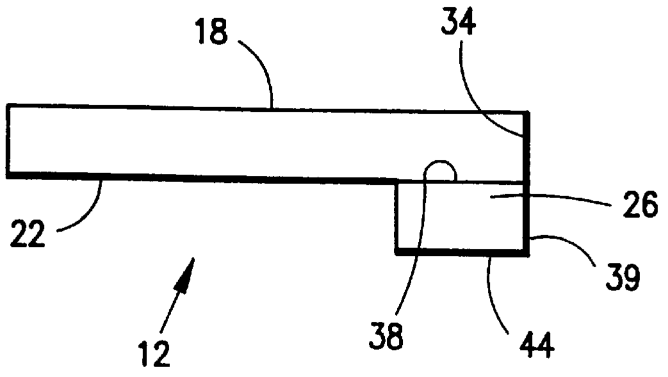
FIG. 2
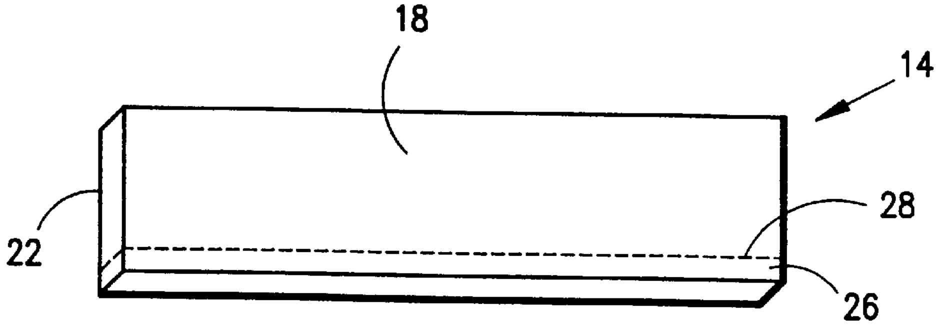
FIG. 3
FIG. 4
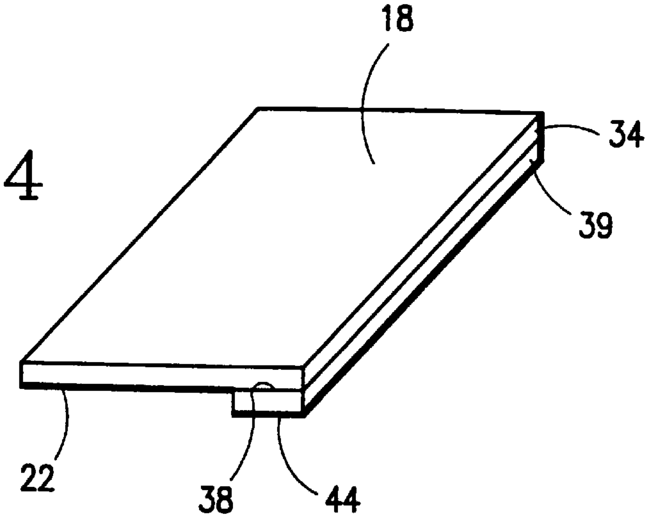

FIG. 5
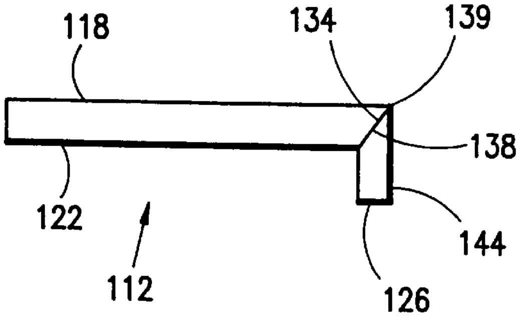
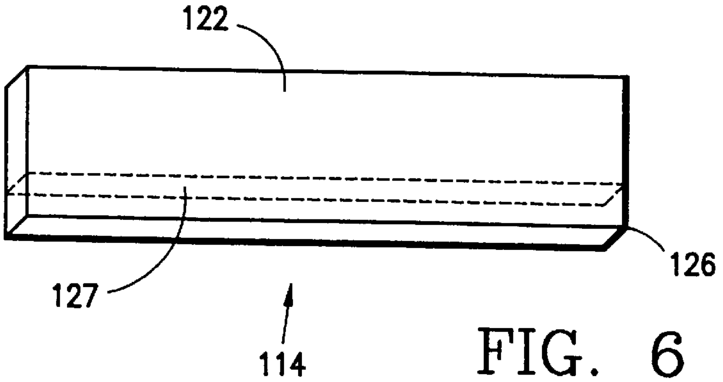
FIG. 6
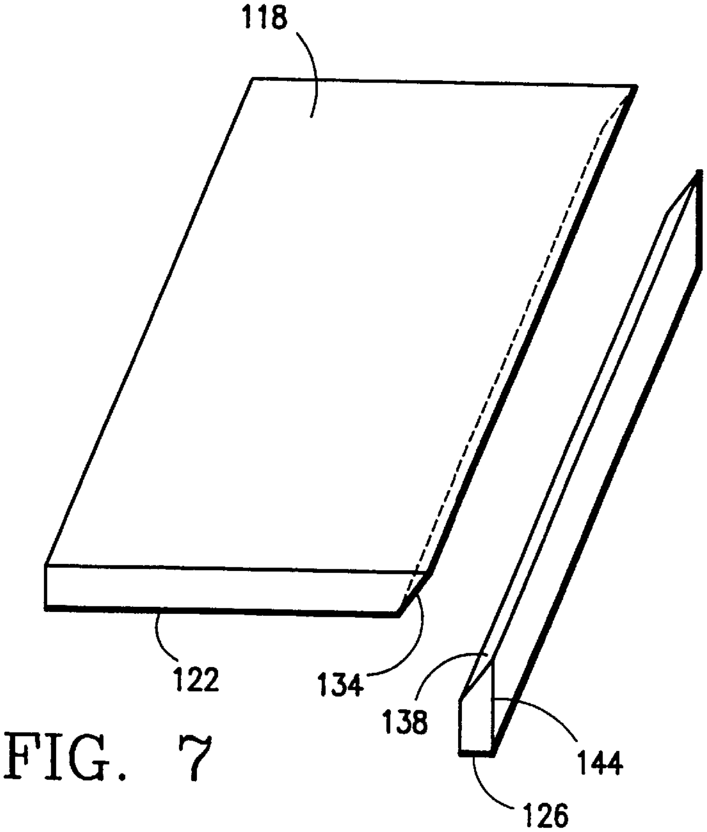
FIG. 7

PROCESS FOR FABRICATING COUNTERTOPS

BACKGROUND OF THE INVENTION

1. Field of the Invention

The invention relates to a method and apparatus for fabricating countertops. More particularly, the invention relates to an automated system for fabricating granite, marble, engineered stone and/or solid surface material countertops.

2. Description of the Prior Art

Granite, marble, engineered stone, and solid surface materials have become the materials of choice in the manufacture of countertops for home and commercial use. While the material composition of engineered stone and solid surface materials has improved over time, the methods employed in fabricating countertops, and other surfaces, from these materials has not changed.

Specifically, countertops made from granite, marble, engineered stone and solid surface materials are commonly fabricated in a manual, labor intensive manner. The fabricators are highly skilled artisans and rely upon a series of manual techniques to complete the fabrication of a countertop. Current techniques have been in use for many years, and few developments have been initiated to improve the process of fabricating such countertops.

While the techniques employed by skilled fabricators result in durable and aesthetically pleasing surfaces, the techniques require a substantial investment in time, equipment and space. The time consumed in the manufacturing process substantially increases the price of installing granite, marble, engineered stone and solid surface materials within a home or commercial application.

If the fabrication time for these materials were reduced, the cost of installing an engineered stone countertop, for example, would drop. As such, many consumers who would prefer an engineered stone countertop, but were previously unable to afford such countertops, would be able to purchase the countertop they desire. A need, therefore, exists for an automated system for fabricating countertops from granite, marble, engineered stone and solid surface materials, as well as other related materials. The present invention provides such a system.

SUMMARY OF THE INVENTION

It is, therefore, an object of the present invention to provide an integrated system for fabricating a countertop from a slab. The system includes a saw for cutting an apron strip of a predetermined size from a slab, an adhesive station where adhesive is applied prior to bonding the apron strip to the slab, a translating device for moving the apron strip into position along an edge of the slab, and a press securely holding the apron strip and the slab while the adhesive forms a secure bond between the apron strip and the slab.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 2 is a cross sectional view of a countertop manufactured in accordance with the present invention.

FIG. 3 is a perspective view of a slab processed in accordance with the present invention.

FIG. 4 is an exploded view of the countertop.

FIG. 5 is a cross sectional view of a countertop manufactured in accordance with an alternate embodiment of the present invention.

FIG. 6 is a perspective view of a slab in accordance with the embodiment disclosed in FIG. 5.

FIG. 7 is an exploded view of the countertop in accordance with the embodiment disclosed in FIG. 5.

DESCRIPTION OF THE PREFERRED EMBODIMENTS

Figure 1:
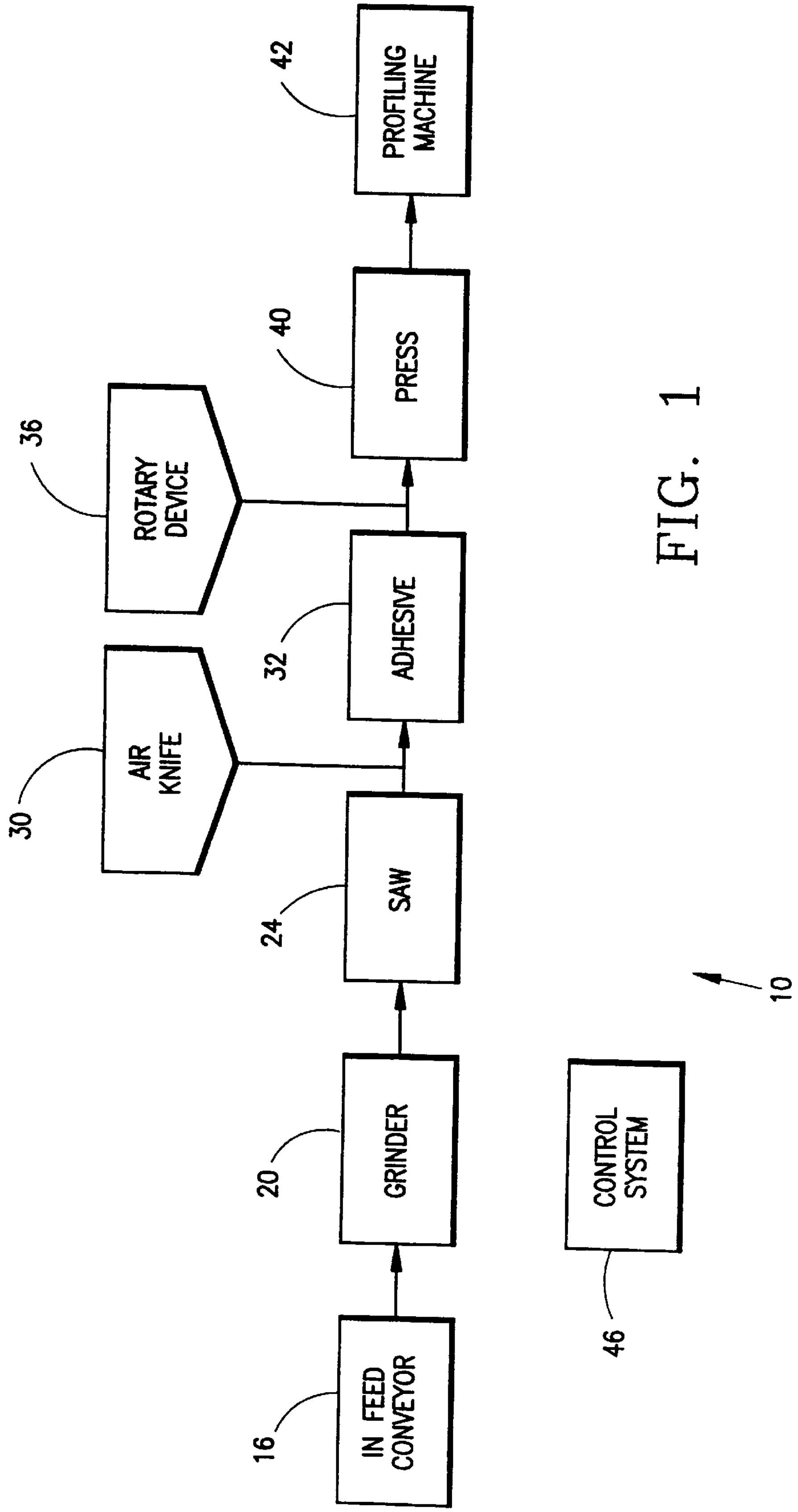
FIG. 1 is a schematic of the present system.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIG. 1, a schematic of the present system 10 is disclosed. The system 10 provides an automated method and apparatus for use in the manufacture of countertops from materials such as, for example, engineered stone, granite, marble and solid surface materials. While engineered stone, granite, marble and solid surface materials are disclosed in accordance with the preferred embodiment of the present invention, other similar materials may be used in accordance with the present invention.

The system 10 is composed of a series of integrated stations facilitating the manufacture of a countertop 12 from a single slab 14 of material. In accordance with a preferred embodiment of the present invention, the slab 14 is an engineered stone composed of approximately 92–93% granite and approximately 7–8% polyester resin. The slab is approximately ¾ inch (2 cm) thick, 10 feet (304.8 cm) long, and 48 inches wide (121.9 cm). As those skilled in the art will readily appreciate, various dimensions are provided throughout the body of the present application and in accordance with the preferred embodiment of the present invention. However, those skilled in the art will understand that the disclosed dimensions may be readily varied to suit specific applications without departing from the spirit of the present invention.

With reference to FIGS. 1–4, the slab is first placed on an in-feed conveyor 16 with its top or good side 18, facing downwardly. The slab 14 is fed into a grinder 20 where the backside 22 of the slab 14 is wet ground and trued.

Once the backside 22 of the slab 14 is properly trued, the slab 14 is conveyed to a saw assembly 24 where an apron strip 26 of approximately 1½ inches (4 cm) is wet cut from the slab 14 (see FIGS. 2 and 3). The apron strip 26 is cut from the forward portion 28 of the slab 14 along the longitudinal axis of the slab 14.

Specifically, and with reference to FIGS. 3 and 4, the apron strip 26 is formed by cutting the apron strip 26 from the front portion 28 of slab 14. In accordance with the preferred embodiment of the present invention, the resulting apron strip 26 is approximately 1½ inches (4 cm) wide (exposed top side 44), ¾ inch (2 cm) thick, and 10 feet (304.8 cm) long. The resulting front edge 34 of the slab 14 is perpendicular to the top side 18 of the slab 14 and is approximately the thickness of the slab 14, that is, ¾ inches (2 cm).

The slab 14 and apron strip 26 are then conveyed to an air knife 30 where the materials are thoroughly dried prior to further processing. Once the materials are thoroughly dried, they are transported to an adhesive station 32 controlled by an operator.

The operator applies adhesive to the backside 22 of the slab 14 at the location where the apron strip 26 is to be bonded. While the disclosed embodiment discloses an operator controlled adhesive station 32, it is contemplated that the adhesive station may be fully automated without departing from the spirit of the present invention. In addition, and in accordance with the preferred embodiment of the present invention, the adhesive is preferably WILSONART 8206, an epoxy adhesive, although other adhesives may be used without departing from the spirit of the present invention. The adhesive is preferably color matched with the stone, or other material, with which it is being used.

A rotary device 36 then translate, more particularly, rotates, the apron strip 26 180° such that its backside 38 of the apron strip faces the backside 22 of the slab adjacent the front edge 34 of the slab 14. Similarly, the cut edge 39 of the apron strip 26 faces outwardly in alignment with the front edge 34 of the slab 14, and the former top side 44 of the apron strip 26 faces downwardly.

The apron strip 26 and slab 14 are then placed within a press 40 where the backside 38 of the apron strip 26 is brought into contact with the backside 22 of the slab 14. The components are then securely held in position for approximately six minutes.

A six minute press time is preferred when WILSONART 8206 adhesive is used to bond engineered stone as discussed above. However, those skilled in the art will readily appreciate that the press times may vary depending upon the materials and adhesive employed with the present system.

After the slab 14 is held within the press 40 for an appropriate time period, the slab 14 is released and ready for final processing. Specifically, the slab 14 is conveyed from the press 40 to a profiling machine 42 where the exposed top side 18 and front edge 34 of the slab 14, as well as the exposed cut edge 39 and top side 44 of the apron strip 26, are shaped as desired by the consumer. Specifically, and in accordance with the preferred embodiment of the present invention, a Bordibreton CT profiling machine is used, although other profiling machines may be used without departing from the spirit of the present invention.

The entire process discussed above is monitored and controlled by a control system 46 integrated with the present system 10.

In accordance with a further embodiment of the present invention, and with reference to FIGS. 5, 6, and 7, the apron strip 126 is formed by cutting a V-groove 127 in the backside 122 of the slab 114. In practice, it is contemplated that the backside will be facing upwardly while the V-groove is formed. The V-groove is approximately 90°, and results in an angled front edge 134 (of slab 114) of 45° and an angled backside 138 (of apron 126) of 45°, although other angular orientations may be employed without departing from the spirit of the present invention. The resulting apron strip 126 is approximately 1½ inches (4 cm) wide (exposed top side 144), ¾ inch (2 cm) thick, 1.06 inches (2.69 cm) along the angled backside portion 138 and 10 feet (304.8 cm) long. The resulting angled front edge 134 of the slab 114 is oriented at a 45° angle and is approximately 1.06 inches (2.69 cm).

By cutting the slab 114 in this manner, the angled front edge 134 of the slab 114 and the angled backside 138 of the apron strip 126 provide additional surface area which improves the bonding strength between the slab 114 and the apron strip 126 when they are assembled in the manner discussed below. In addition, the angled cut results in a seam at the forward point 139 of the resulting countertop 112.

The slab 114 and apron strip 126 are then assembled in much the same manner as discussed above with regard to the embodiment disclosed in FIGS. 2, 3 and 4. Specifically, the slab 114 and the apron strip 126 are conveyed to an air knife 30 where the materials are thoroughly dried prior to further processing. Once the materials are thoroughly dried, they are conveyed to an adhesive station 132 controlled by an operator.

The operator applies adhesive to the angled front edge 134 of the slab 114 at the location where the apron strip 126 is to be bonded. A rotary device 36 then rotates the apron strip 126 such that its angled backside 138 faces the front edge 134 of the slab 114 upon which adhesive has been applied. The apron strip 126 and slab 114 are then placed within a press 40 where the angled backside 138 of the apron strip 126 is brought into contact with the front edge 134 of the slab 114, and the components are securely held in position for a predetermined period of time.

After the slab 114 is held within the press 40 for an appropriate time period, the slab 114 is released and conveyed from the press 40 to a profiling machine 42 where the exposed top side 144 of the apron strip 126, top side 118 of the slab 114, and other portions of the countertop are shaped as desired by the consumer.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An integrated system for fabricating a countertop from a slab, comprising:

means for cutting an apron strip of a predetermined size from a slab;

means for translating the apron strip for positioning along an edge of the slab;

means for attaching the apron strip to the edge of the slab;

means for conveying the apron strip and slab between the means for cutting, the means for translating and the means for attaching; and a control system for monitoring and controlling the integrated system.

2. The integrated fabricating system according to claim 1, wherein the means for cutting includes a saw which wet cuts the slab.

3. The integrated fabricating system according to claim 1, wherein the means for attaching includes an adhesive station where adhesive is applied for bonding the apron strip to the slab.

4. The integrated fabricating system according to claim 3, wherein the means for attaching includes a press for securely holding the apron strip and the slab while the adhesive forms a secure bond between the apron strip and the slab.

5. The integrated fabricating system according to claim 1, further including means for drying the slab and apron strip prior to treatment by the means for attaching.

6. The integrated fabricating system according to claim 1, further including a grinding means for treating the slab prior to treatment by the means for cutting.

7. The integrated fabricating system according to claim 1, wherein the apron strip is cut from a front side of the slab and after cutting the slab includes a top side, a backside, and a front edge, and the apron strip similarly includes a top side and a backside, and the means for translating rotates the apron strip such that the backside of the apron strip is secured to the slab.

8. The integrated fabricating system according to claim 7, wherein the apron strip is cut from the slab such that the front edge of the slab is cut at an oblique angle and the backside of the apron strip is cut at an oblique angle.

9. The integrated fabricating system according to claim 8, wherein the front edge of the slab is cut at approximately a 45° angle and the backside of the apron strip is cut at approximately a 45° angle.

10. The integrated fabricating system according to claim 7, wherein the apron strip is cut from the slab such that the front edge of the slab is cut at a 90° angle and a cut edge of the apron strip is cut at a 90° angle.

11. The integrated fabricating system according to claim 7, further including means for shaping the apron strip after the apron strip is attached to the front edge of the slab.

12. The integrated fabricating system according to claim 7, wherein the means for cutting cuts the apron strip such that the top side of the apron strip is larger than the thickness of the slab.

13. The integrated fabricating system according to claim 1, further including means for shaping the apron strip after the apron strip is attached to the slab.

14. The integrated fabricating system according to claim 1, wherein the slab is selected from the group consisting of engineered stone, granite, and marble.

15. An integrated system for fabricating a countertop from a slab, comprising:

- a saw for cutting an apron strip of a predetermined size from a slab;
- an adhesive station where adhesive is applied prior to bonding the apron strip to the slab;
- a translating device for translating the apron strip for positioning along an edge of the slab;
- a press securely holding the apron strip and the slab while the adhesive forms a secure bond between the apron strip and the slab;
- means for conveying the apron strip and slab between the saw, adhesive station, translating device and press; and
- a control system for monitoring and controlling the integrated system.

16. The integrated fabricating system according to claim 15, further including a drier for drying the slab and apron strip prior to treatment by the adhesive station.

17. The integrated fabricating system according to claim 15, further including a grinder for treating the slab prior to treatment by the saw.

18. The integrated fabricating system according to claim 15, wherein the apron strip is cut from a front side of the slab and after cutting the slab includes a top side, a backside, and a front edge, and the apron strip similarly includes a top side and a backside, and the translating device rotates the apron strip such that the backside of the apron strip is secured to the slab.

19. The integrated fabricating system according to claim 18, wherein the apron strip is cut from the slab such that the front edge of the slab is cut at an oblique angle and the backside of the apron strip is cut at an oblique angle.

20. The integrated fabricating system according to claim 19, wherein the front edge of the slab is cut at approximately a 45° angle and the backside of the apron strip is cut at approximately a 45° angle.

21. The integrated fabricating system according to claim 18, wherein the apron strip is cut from the slab such that the front edge of the slab is cut at a 90° angle and a cut edge of the apron strip is cut at a 90° angle angle.

22. The integrated fabricating system according to claim 18, further including means for shaping the apron strip after the apron strip is attached to the front edge of the slab.

23. The integrated fabricating system according to claim 18, wherein the saw cuts the apron strip such that the top side of the apron strip is larger than the thickness of the slab.

24. The integrated fabricating system according to claim 15, further including means for shaping the apron strip after the apron strip is attached to the slab.

25. The integrated fabricating system according to claim 15, wherein the slab is selected from the group consisting of engineered stone, granite, and marble.

26. The integrated fabricating system according to claim 1, wherein the saw cuts the apron strip from the slab such that the apron strip is separate from the slab.

27. The integrated fabricating system according to claim 15, wherein the saw cuts the apron strip from the slab such that the apron strip is separate from the slab.

* * * * *